May 7, 1963
C. E. EGAN
3,088,392
DUCT CONSTRUCTION
Filed Sept. 8, 1960
2 Sheets-Sheet 1
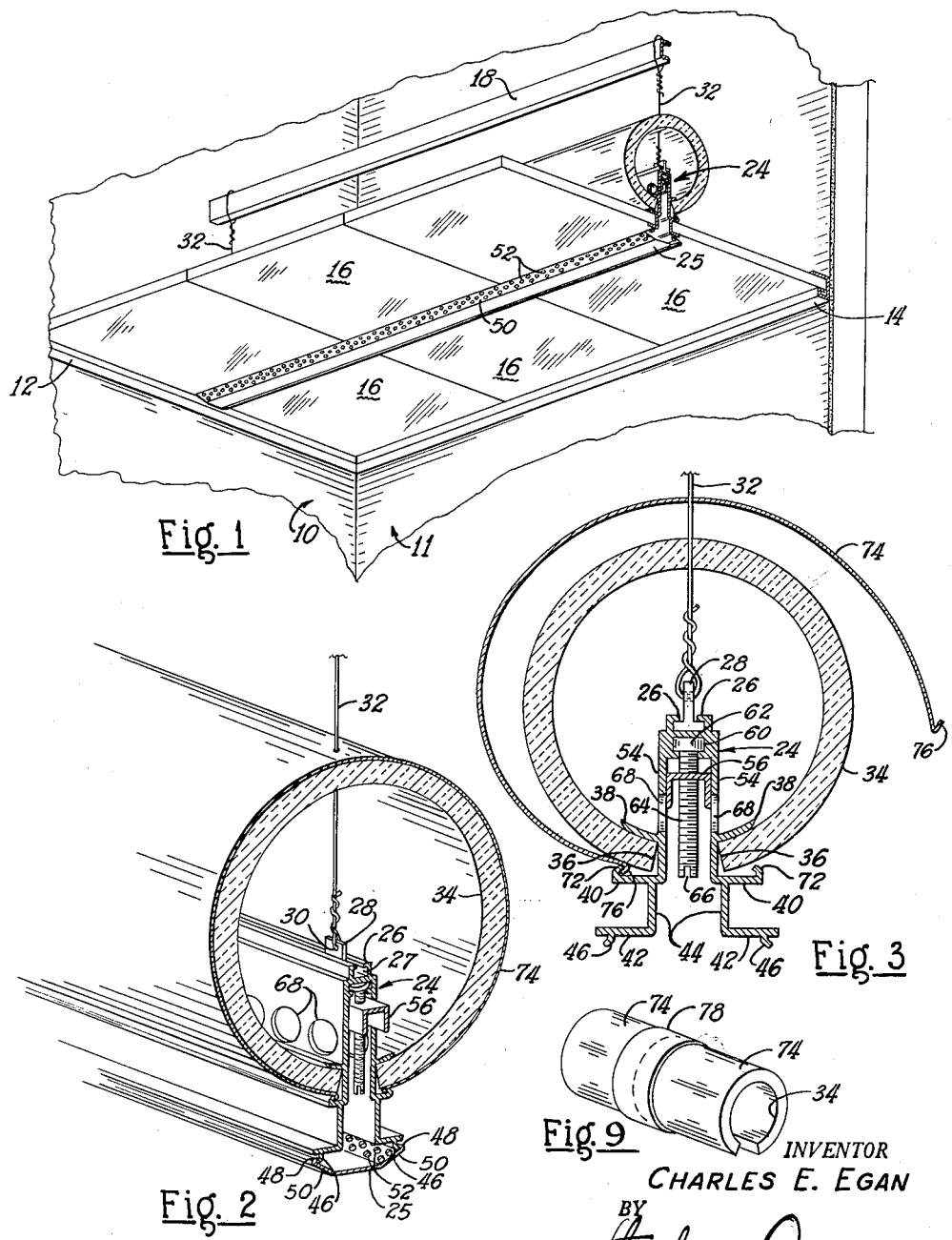
INVENTOR
CHARLES E. EGAN
BY
*Staehie & Overman*
ATTORNEYS May 7, 1963  C. E. EGAN  3,088,392
DUCT CONSTRUCTION
Filed Sept. 8, 1960  2 Sheets-Sheet 2
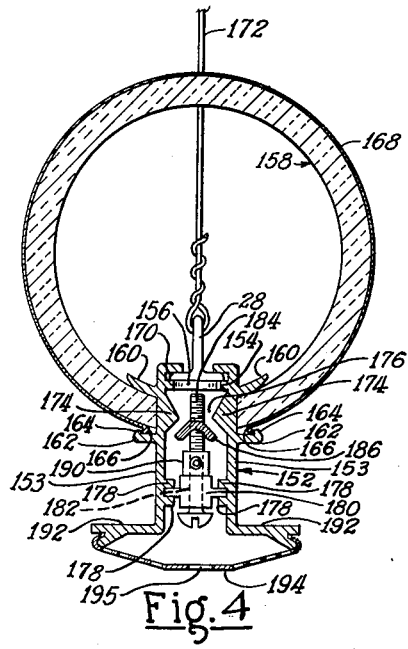
Fig.4
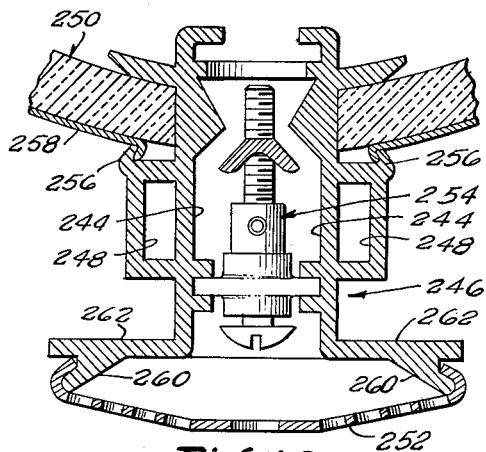
Fig.10
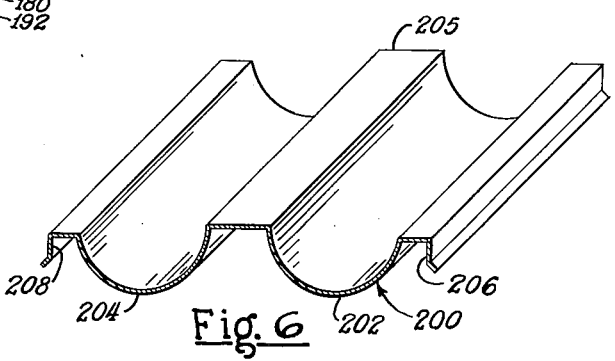
Fig.6
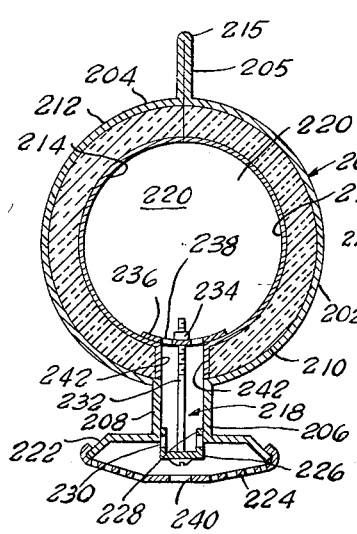
Fig.5
Fig.8
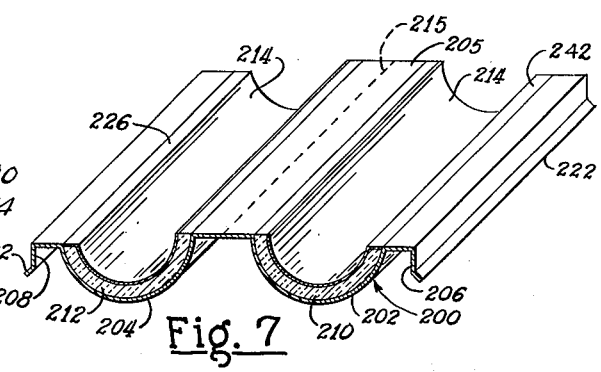
Fig.7
INVENTOR
CHARLES E. EGAN
BY
ATTORNEYS

United States Patent Office 3,088,392
Patented May 7, 1963

3,088,392
DUCT CONSTRUCTION
Charles E. Egan, Toledo, Ohio, assignor to Owens-Corning Fiberglas Corporation, a corporation of Delaware
Filed Sept. 8, 1960, Ser. No. 54,656
5 Claims. (Cl. 98—40)

This invention relates to a duct system and duct construction and more particularly to an arrangement or system for building installation and especially an arrangement wherein the duct construction is suspended and correlated with a sub-ceiling for conveying air into a room or compartment for heating, cooling or ventilating through an air distribution means having an open or foraminous area.

The system and duct construction of the invention have particular utility for installation in connection with sub-ceiling constructions wherein the sub-ceiling material is an acoustic tile or sheeting having sound damping or attenuating characteristics wherein air conveying ducts are associated with and preferably above the sub-ceiling, the duct system being arranged to deliver air through air distribution panels for dispersion throughout the adjacent room or space.

Tubular ducts for such purposes have been formed of glass fibers and a duct of this character is disclosed in Rachlin Patent 2,937,589, granted May 24, 1960, in which the fibers are impregnated with a suitable resin to maintain the tubular shape. Such duct constructions have been difficult to assemble and lack effective means for securing the duct to a support. In air conditioning systems, the cool air flowing through the ducts fosters the condensation of moisture by reason of the porosity of the fibrous walls of the ducts.

The present invention relates to a duct system and duct arrangement wherein the air conveying component or duct construction is fashioned of mineral fibers such as glass fibers encompassed by an envelope equipped or fashioned with simple, yet effective, means for securing the envelope in embracing relation with the duct construction.

Another object of the invention resides in a fibrous duct construction which is supported or suspended by suitable means and is embraced within an imperforate medium, shield or casing in conjunction with interlocking means for readily applying the shield or casing to the fibrous duct in a manner providing a moisture barrier for the duct.

Another object of the invention resides in a fibrous duct and support therefor with an imperforate envelope surrounding the fibrous duct and interlocked with the support in a manner whereby the envelope may be applied without the use of special tools, the envelope providing reflective insulation whereby the insulating efficiency of the duct or duct system is improved.

Another object of the invention resides in a supporting arrangement for a fibrous duct enclosed in an envelope, the arrangement embodying means for varying or controlling the amount and distribution of air flow from the duct into the adjacent room or space whereby to control the dispersion or distribution of air delivered from the duct.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is an isometric view of a portion of a sub-ceiling arrangement illustrating one form of duct arrangement of the invention;

FIGURE 2 is an isometric view showing a portion of the duct construction and support means therefor illustrated in FIGURE 1;

FIGURE 3 is a sectional view through the duct arrangement shown in FIGURE 2 illustrating the method of applying the envelope to the duct construction;

FIGURE 4 is a transverse sectional view illustrating a modified form of support and air distribution means for the duct construction;

FIGURE 5 is an isometric view of an element of the supporting means for the duct construction shown in FIGURES 2, 3 and 4;

FIGURE 6 is an isometric view illustrating a modified form of envelope or casing for a fibrous duct construction;

FIGURE 7 is an isometric view showing the method of assembling the fibrous duct components with the envelope illustrated in FIGURE 6;

FIGURE 8 is a transverse sectional view illustrating the duct and envelope construction fashioned from the components shown in FIGURE 7;

FIGURE 9 illustrates a form of sealing means for the joints between adjacent duct sections; and FIGURE 10 is a fragmentary view similar, in part, to FIGURE 4 and showing a modified form of construction incorporating auxiliary heating or cooling means.

While the duct system and duct construction of the invention has particular utility in conveying and distributing air for space heating, cooling, air conditioning or ventilating purposes, it is to be understood that the duct or duct system may be used for conveying and distributing gases for other purposes.

The duct system and duct construction is illustrated in connection with a room provided with a sub-ceiling which may be of vibration absorbent material, acoustic tile or other surfacing material equipped with means through which air from the duct arrangement of the invention is distributed or dispersed in a room.

Referring initially to FIGURE 1, there is illustrated a portion of a room defined by adjoining walls 10 and 11 which are respectively provided with suitable molding strips 12 and 14 of a cross-sectional configuration to embrace the edge regions of ceiling panels or tiles 16. The panels or tiles 16 are supported or suspended by means such as bars arranged in spaced relation above the ceiling. One of such bars 18 is illustrated in FIGURE 1. The duct construction of the invention may be supported by the bars 18 through the medium of outlet members 24 which are equipped with perforated air dispersing members 25.

The duct construction of the invention is provided with an inverted generally U-shaped or channel-shaped air outlet member 24 which directly supports the duct construction as shown in FIGURES 1, 2 and 3. The upper region of the air outlet member or fitting 24 is formed with projections 26 shaped to provide a T-shaped slot 27 accommodating T-shaped lugs or members 28, one of which is shown in detail in FIGURE 5, each lug being formed with an opening 30 for attachment of a suspension member 32.

In the embodiment illustrated, the suspension members 32 are formed of wire, the upper end of each suspension member being anchored to a bar 18, and the lower end of each suspension member extending through an opening 30 in a T-shaped fitting or lug 28 to support the ceiling tiles, the air outlet fitting 24 and the duct construction.

The channel-shaped member 24 is preferably formed of extruded aluminum or other suitable material to minimize the weight of the suspended assembly. Associated with the channel-shaped member or air outlet control means 24 is a tubular duct 34 which, in the form illustrated in FIGURES 1 through 3, 10 and 13, is of generally circular cylindrical shape in cross-section.

The tubular duct 34 is preferably fashioned of mineral fibers such as fibers formed of glass, slag or fusible rock. The mass of mineral fibers forming the duct are compressed to a suitable density and the compressed fibers impregnated with a suitable binder or adhesive cured to impart mass integrity to the fibrous duct. The duct 34 is fashioned with a longitudinally extending slot or opening to accommodate the channel-shape member 24 in the manner particularly illustrated in FIGURE 3.

The fibrous duct 34 may be fabricated as a planar sheet or mat, subsequently rolled or contoured to the cylindrical shape and the ends 36 engaged with opposed exterior surface regions of the member 24. The duct 34 may be fashioned as a cylinder subsequently slit or severed lengthwise to accommodate the lengthwise extending member 24.

As particularly shown in FIGURE 3, the channel-shaped member 24 is provided with laterally projecting, lengthwise extending portions or flanges 38 adapted to be engaged by the end regions of the duct 34.

The member 24 is also fashioned with laterally extending flanges 40 and laterally extending flanges 42, the latter connected with flanges 40 by wall portion 44. Each set of flanges 42 and 44 define a region or space accommodating the edge regions of the ceiling panels or tiles 16 whereby the same are supported by the flanges 42. Each of the flanges 42 is provided with an angularly arranged lengthwise extending projection 46 as shown in FIGURES 2 and 3. A perforated or foraminous strip, escutcheon panel or air dispersing member 25 is arranged to straddle the outlet region of the channel-shaped member 24.

The escutcheon or member 25 is formed with convergingly arranged flange portions 48 on its longitudinally edge regions which are adapted to snap over the projections 46 provided on the flanges 42 to removably secure the member 25 to the channel member 24. The escutcheon or member 25 is formed of comparatively thin sheet material such as aluminum alloy having a sufficient degree of flexibility whereby the inherent stress in the material maintains the interlocking engagement of the edge flanges 48 with the projections 46 but of sufficient flexibility so that the member 25 may be temporarily distorted or flexed to an extent to facilitate removal thereof for inspection or for the purpose of adjusting air control valve or damper means hereinafter described.

As shown in FIGURES 1 and 2, the member 25 is fashioned with angularly arranged facets 50 each provided with a plurality of small openings 52 for dispersing or distributing the air from the duct in the space beneath the ceiling tiles 16. Means is associated with the channel member 24 for regulating the flow rate and delivery of air or other gas lengthwise of the duct 34 so as to obtain desired distribution of the air or gas into the space beneath the ceiling 16.

Arranged lengthwise within the spaced parallel walls 54 of the channel member 24 is a valve member, fluid control means or damper 56. In the embodiment illustrated in FIGURES 1 through 3, the member or damper 56 is of channel or U-shape in cross-section with the leg portions of member 56 in slidable contact with the inner opposed surfaces of the walls 54 of the channel-shaped member 24. The upper lengthwise region of the member 24 is formed with a T-shaped slot 60 to accommodate the heads 62 of threaded members 64.

The bight portion of valve or damper member 56 adjacent each end region is fashioned with a threaded opening to accommodate the threaded portions of members 64. The extremity of each member 64 is formed with a slot or kerf 66 to receive a tool for rotating each threaded member to adjust the relative position of the valve member or damper 56 in the channel member 24. The spaced walls 54 of the channel-shaped member 24 are provided with open areas 68 which, in the embodiment illustrated in FIGURES 1 through 3, are of circular shape, although other configuration of open area may be employed if desired.

The open areas 68 are arranged lengthwise of the member 24 and adjacent the valve means 56 whereby adjustment of the valve means partially obturates the open areas 68. As adjustment of the valve member or obturator 56 is had through the medium of a threaded member 64 adjacent each end region of the valve member, two functions are accomplished by the adjusting means.

If it is desired to reduce or increase the effective flow area of all of the openings 68 of a channel-shaped member 24, the two threaded members 64 are rotated so that the member 56 is elevated or lowered the same vertical distance throughout its length whereby air or gas flow from the interior of the duct 34 through the channel-shaped member 24 is at a uniform rate throughout the length of the member 24.

If it is desired to vary the air flow through the openings lengthwise of member 24, one of the threaded members 64 may be adjusted or moved a greater distance than the other at the opposite end region of the member, which adjustment obturates or covers a lesser or greater area of the openings, the increase or decrease in uncovered area being progressive from one end of the valve member 56 to the other due to the angular positioning of the valve member with respect to the rows of openings 68 in the walls 54.

Through this type of compound adjustment, the air flow from the duct 34 through openings 68 in the member 24 may be varied throughout the length of the member 24 whereby more or less air or gas is delivered into particular regions of the room or enclosure through the perforations in the escutcheon or panel 25.

The arrangement of the invention is inclusive of an imperforate closure, covering or shroud for the exterior surface of the fibrous duct 34. As particularly shown in FIGURES 2 and 3, the laterally extending flanges or webs 40 are formed along their lengthwise edges with upwardly and inwardly directed projections or flanges 72. Surrounding or embracing the fibrous duct 34 is an imperforate closure 74 of suitable flexible material which serves to maintain the fibrous duct 34 in assembled relation with the member 24 and provide a moisture barrier for the fibrous duct.

Each of the longitudinal edge regions of the sheet or closure 74 is formed with an outwardly extending flange or projection 76 adapted for interlocking engagement with a projection 72 in the manner illustrated in FIGURE 2, the step of establishing one interlocking connection being illustrated in FIGURE 3. The peripheral dimension of the sheet 74 with reference to the periphery of the duct 34 is such that the projection 76 engages the projections 72 so that the fibrous duct is under slight compression whereby the stress of compression of the fibers of the duct maintain the projections 76 in interlocking engagement with the projections 72 forming a tight joint at the interlocking region.

The relative angularities of the projections 72 and 76 are such that the projection 76 may be snapped into interlocking engagement with the projection 72 without any liability of the sheet or closure becoming dislodged. The sheet or closure 74 has reflective insulating characteristics so as to supplement the insulating effectiveness of the fibrous duct 34.

Furthermore where the duct system is employed or utilized for conveying cooled air or other cooled gas, the closure 74 provides a moisture proof barrier to eliminate or greatly reduce moisture condensation. If inspection or replacement is desired, pressure exerted on the sheet or closure 74 inwardly of the fibrous duct 34 effects sufficient compression of the fibers to facilitate disengagement of the projections 72 and 76 to remove the enclosure 74.

The enclosure 74 is preferably fashioned of comparatively thin sheet metal such as aluminum, steel or the like but may be made of plastic of sufficient thickness and rigidity to maintain interlocking engagement with the projections 72. Sheet aluminum of a thickness not less than twelve thousandths of an inch has been found to be satisfactory.

Where several aligned sections of the closure 74 are employed with ducts of substantial lengths, the adjacent end regions of the enclosures may be overlapped a small amount to effect a seal at the overlap or, as shown in FIGURE 9, adjacent sections 74 may be arranged in abutting relation and the abutting region enclosed by a sealing band 78. The end regions of the sealing band may be provided with projections similar to the projections 76 on the enclosure section 74 and interlocked with the projections 72 on the member 24.

FIGURE 4 illustrates a modified form of valve arrangement for regulating or controlling air or gas flow from the duct construction to the space or region exteriorly of the distribution panel. The arrangement includes a generally U-shaped member 152 having parallel leg portions 153 joined at their upper end region by a web 154. The web 154 is provided with lengthwise spaced openings 156 to facilitate air or gas flow from the duct 158 through the U-shaped member 152.

The duct 158 shown in FIGURE 4 is similar to the duct 34 shown in FIGURES 2 and 3 and is fashioned of binder-impregnated mineral fibers, the edges of the duct abutting the walls of the U-shaped member 152. The inner surface of the duct 158 is position by means of flanges 160 formed on the U-shaped member. The member 152 is formed with laterally extending projections or ledges 162 having abutment portions or flanges 164 engaged by hook-like portions 166 formed on the edge regions of the imperforate casing or enclosure 168 embracing the fibrous duct 158.

The upper region of the member 152 is formed with a T-shaped lengthwise slot 170 to accommodate T-shaped lugs 28 of the character shown in FIGURE 5. A supporting wire or a cable 172 may be secured to the lugs 28 for suspending the duct and associated components from a suitable support (not shown), the wires or cables 172 extending through openings in the wall region of the duct 158 and its enclosure 168.

The walls 154 of member 152 are formed with inwardly extending, lengthwise arranged ribs or raised portions 174 providing a restricted throat 176 through which air or gas from the duct 158 may flow through the member 152. Extending lengthwise and projecting outwardly from the walls 154 are projections 178 which are spaced vertically to accommodate fittings 180, one being shown in FIGURE 4. Extending through a bore in each of the fittings 180 is an adjusting member 182, the upper portion 184 of which is threaded and adapted to be received in a threaded opening in a valve member or damper 186 of L-shaped cross-section.

A collar 190 is secured by a setscrew to each adjusting member 182 to maintain the adjusting member 182 against lengthwise movement relative to the fitting 180. The adjusting members 182 provide the support for the valve member 186. By rotating the adjusting members 182, the position of the valve member 186 with respect to the restricted throat 176 may be varied to regulate or control air or gas flow through the throat 176.

The member 152 is formed with laterally extending flanges or ledges 192 which provide support for a perforated air or gas distributing panel or escutcheon 194 supported in the same manner as the escutcheon 20 shown in FIGURE 2. The central region of the panel 194 may be provided with an opening 195 in alignment with each of the adjusting members 182 to accommodate a tool for rotating the adjusting members 182 without necessitating removal of the panel. The valve member 186 may be adjusted to an out-of-parallel position with the lengthwise extending throat 176 provided by the ribs 174 to vary the air or gas distribution lengthwise of the valve member 186.

FIGURES 6 through 8 illustrate another form of duct construction embodying an imperforate casing or shroud providing a moisture barrier and functioning as a support for the duct construction.

The enclosure, casing or shroud 200 is prefabricated of sheet metal or other imperforate material to the configuration shown in FIGURE 6, the configuration comprising two semi-cylindrically shaped portions 202 and 204 separated by a flat portion 205. The semi-cylindrical portions 202 and 204 terminate in portions 206 and 208, respectively, of generally L-shaped configuration in cross-section.

The member 200 may be made of comparatively thin sheet aluminum, sheet steel or the like but aluminum is preferred because of its light weight. The semi-cylindrical portions 202 and 204 are lined with sections of comparatively dense mats 210 and 212 of mineral fibers as shown in FIGURE 7. If desired an inner facing or imperforate member 214 may be employed as an inner facing for each of the fibrous bodies or sections 210 and 212.

The liner or facing members 214 may be joined by a suitable adhesive to the fibrous sections. In fabricating the assemblage shown in FIGURE 11 to form the duct illustrated in FIGURE 8, the portion 205 of the member 200 is bent about a central zone or line indicated in broken lines at 215 in FIGURE 7, the material being bent upon itself as shown in FIGURE 8 whereby the sections 210 and 212 form a substantially cylindrically shaped body. The L-shaped portions 206 and 208 in the finished duct configuration are spaced as indicated at 218 forming a throat through which air or gas flows from the duct 220.

The portions 206 and 208 of the member or casing 200 are provided with angularly arranged edge regions 222 which are engaged by angularly engaged edge regions of a perforated air dispersing or distributing panel 224. It should be noted that in this form of construction the enclosure for the fibrous duct construction fashioned of the mat sections 210 and 212 forms the enclosure therefor and the support for the perforated panel 224.

In this embodiment of the invention the portions 206 and 208 form the channel through which air is conveyed from the duct 220 to the interior of the perforated dispersion panel 224. In common with the teachings of the earlier described embodiments of the invention, air flow through this channel, i.e., the opening formed by the space 218, is controlled by the use of a suitable valve illustrated as comprising an elongated U-shaped member 226 having parallel upwardly directed arms 228 through each of which there is formed a longitudinally extending series of openings 230. The member 226 is suspended at the lower end of the space 218 between the portions 206 and 208 by a plurality of suspension and adjustment bolts 232 which extend upwardly through the space 218 and are threaded into tapped collars 234 formed or secured along the center line of a suspension pan 236. The suspension pan 236 is perforated by a plurality of openings 238 through which air flows from the duct 220 into the space 218. The heads of the bolts 232 may be reached through enlarged openings 240 formed along the center line of the panel 224. By threading the bolts 232 more or less into the collars 234 the perforated member 226 may be raised or lowered relative to the lower corners between the portions 206 and 208 and the horizontal flanges thereof to vary the openings 230 and thus the flow of air from the space 218 outwardly through the dispersion panel 224.

The contiguous lapped portions of the section 205 may be provided with lengthwise spaced openings to accommodate wires or cables (not shown) for supporting or suspending the duct construction shown in FIGURE 8. The edge regions of the fibrous sections 210 and 212 may be faced through the medium of extensions 242 formed on the inner liners 214. As shown in FIGURE 8, the extensions 242, forming the facing for the edges of the fibrous mat sections, are aligned with portions of the member 200 forming the throat 218 and provide a continuation of the throat.

The air or gas dispersed or distributed from the duct construction may be further cooled by circulating cooling fluid through tubes or ducts arranged lengthwise of the generally U-shaped fitting in the duct construction, as illustrated in FIG. 10. The walls of such tubes or ducts may be provided with fins or vanes extending laterally into the path of the air moving through the U-shaped fitting, the fins or vanes being spaced lengthwise of the duct construction. The tubes or tubular means may be formed integral with the U-shaped fitting and the cooling fins joined to a wall or walls of the U-shaped fitting, or a separate tubular means may be disposed lengthwise of the fitting and provided with spaced fins.

In FIGURE 10 there is illustrated such a construction provided with cooling means formed by constructing vertical walls 244 of a channel 246 with longitudinally extending cores 248 through which circulating water or other medium, either hot or cold, may be pumped by conventional mechanisms in order to further cool or heat air flowing from the interior of a duct, fragmentarily indicated at 250 and discharged into the space involved through the channel 246 and a dispersion panel 252 connected thereto. In common with the earlier described embodiments of the invention the channel 246 may be provided with adjustable valve means generally indicated at 254 and with suitable flanges 256 which are engageable with a duct jacket 258. The dispersion panel 252 may be removably snapped over lips 260 formed at the margins of ceiling element support flanges 262 located on the lower ends of the walls 244 of the channel 246.

It is apparent that, within the scope of the invention, modifications and different arrangements may be made other than as herein disclosed, and the present disclosure is illustrative merely, the invention comprehending all variations thereof.

I claim:

1. An air distribution duct assembly for supplying air to the space in a room beneath the sub-ceiling thereof, said assembly comprising, in combination, and elongated, open-bottomed, channel member having laterally spaced, substantially parallel, vertical legs and a horizontal web extending across between said legs, a plurality of air passages through the upper portion of said channel member along the length thereof, a hollow, elongated duct comprising an outer imperforate resilient sheet material jacket and an inner layer of heat insulating material enclosed by said sheet material, said duct having a longitudinal opening thereinto defined by spaced edges of the walls thereof, flange means on the outer sides of said channel member for engaging the outer surface of the walls of said duct with the edges of the walls of said duct located on opposite sides of the air passages in said channel member, whereby said channel member and said duct are in air communication with each other through their length, turned over lips on the outer sides of said flange means and oppositely turned lips on the edges of said jacket, said lips being engageable for retaining said duct on said member, assembly hangers extending downwardly through said duct and connected to said channel member, outwardly extending sub-ceiling support flanges on the lower ends of said legs of said channel member and an air to flow controller removably mounted at the open bottom of said channel member.

2. An air distribution duct assembly according to claim 1 and second flange means on said channel member spaced from said first flange means for engaging the inner surfaces of the edges of said duct.

3. An air distributing system for a space beneath a sub-ceiling of a room having a main structural ceiilng and a space between sad main ceiling and said sub-ceiling, said system comprising, in combination, (A) an elongated hollow channel member (1) having horizontally spaced, parallel vertical walls, (2) said member being open at the upper portion thereof for the passage of air thereinto throughout the length thereof and (3) the walls thereof defining an elongated air opening at the bottom, (B) a generally tubular air duct, (1) the walls of said duct defining an elongated, longitudinally extending slot opening from said duct throughout the length thereof for the passage of air therethrough, (2) said duct being fabricated from a lightweight resilient thermal insulating material having resistance to deformation, (C) a jacket for said duct circumjacent thereto and (1) having margins flanking the slot in said duct, (2) said jacket being fabricated from a resilient air and moisture vapor impervious sheet material, (D) a flange on the outer side of each of said side walls (1) engageable beneath the outer side of the walls of said duct adjacent the slot defined thereby and (2) a turned over lip on the edge of each of said flanges, (E) a hook-like lip on the edge of each of said jacket margins (1) turned oppositely to and (2) engageable with said turned over lips on said flanges for retaining said jacket and said duct in mating relationship to said member with the slot in said duct communicating with the interior of said member through the open upper portion of said member for the passage of air therebetween, (F) sub-ceiling element support flanges on the outer sides of said vertical walls of said member at the lower portions thereof and (G) means at the upper central portion of said member engageable with depending hangers for supporting said member and said duct from an overlying main ceiling and in the space above a sub-ceiling.

4. An air distributing system according to claim 3 in which the lateral circumferential dimension between the turned over lips on said jacket is such that engagement thereof with the hook-like lip on the margin of said duct places said duct in compression, whereby the resiliency of said duct and said jacket urges said lips into retaining engagement.

5. An air distributing system according to claim 3 and a diffuser positioned across the elongated air opening.

References Cited in the file of this patent

UNITED STATES PATENTS

| | | |
|---|---|---|
| 1,916,908 | Stacey | July 4, 1933 |
| 2,172,944 | Norris | Sept. 12, 1939 |
| 2,644,389 | Dauphinee | July 7, 1953 |
| 2,833,199 | Wakefield | May 6, 1958 |
| 2,863,606 | Tatsch | Dec. 9, 1958 |
| 2,937,589 | Rachlin | May 24, 1960 |